May 15, 1951 — C. D. HILLMAN ET AL — 2,552,893
THEODOLITE SCALE READING SYSTEM
Filed June 8, 1950
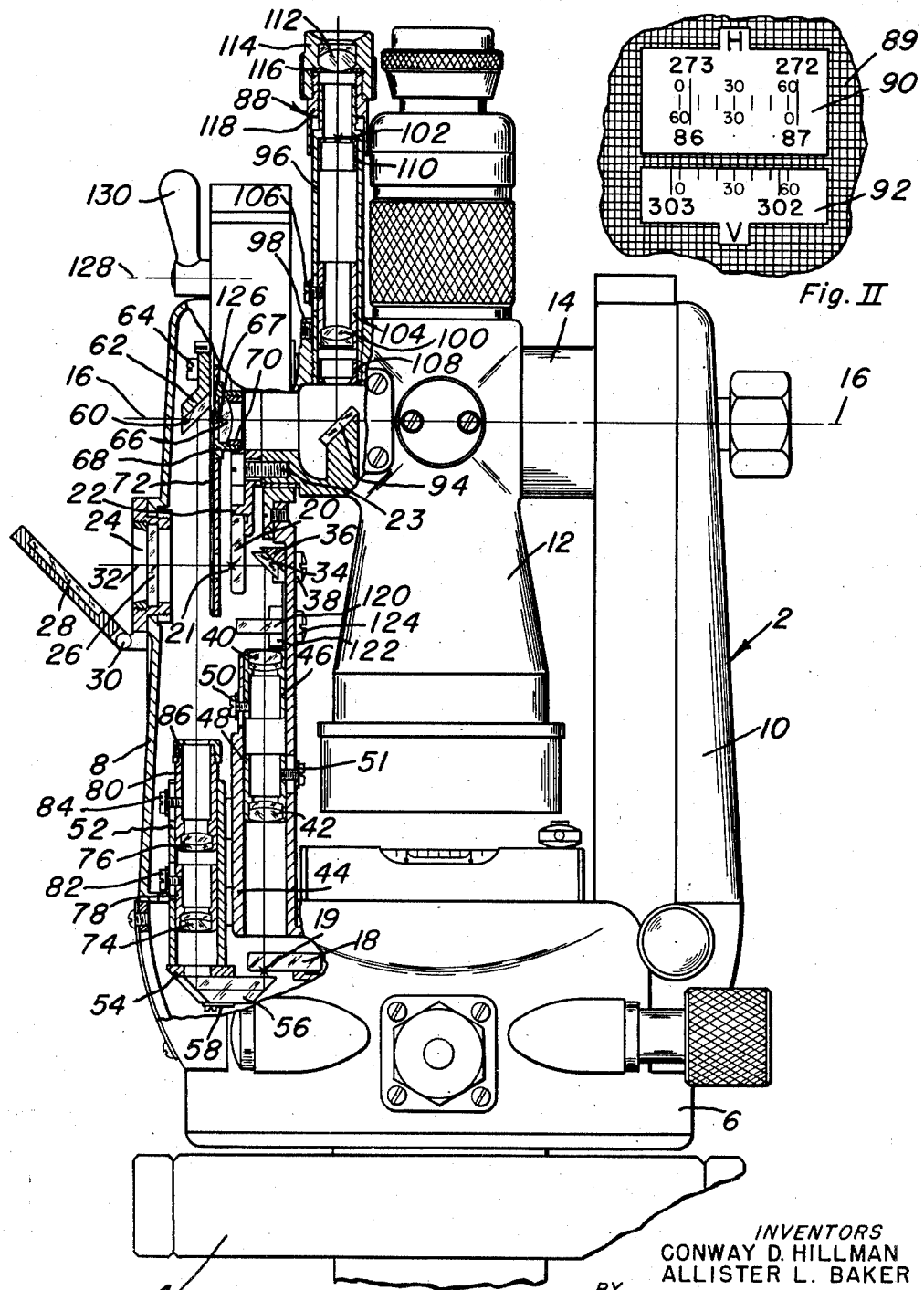
Fig. I
Fig. II
INVENTORS
CONWAY D. HILLMAN
ALLISTER L. BAKER
BY 
ATTORNEY Patented May 15, 1951

2,552,893

UNITED STATES PATENT OFFICE 2,552,893

THEODOLITE SCALE READING SYSTEM

Conway D. Hillman, East Orange, and
Allister L. Baker, Denville, N. J.

Application June 8, 1950, Serial No. 166,888

7 Claims. (Cl. 88—1)

This invention relates to the type of surveying instruments generally referred to as theodolites and more specifically as optically read theodolites. The invention relates more particularly to the scale reading system of an optically read theodolite.

The scale reading systems of prior art optically read theodolites are extremely complicated and expensive to manufacture. This is one reason why this type of instrument has not been produced on a commercial scale in this country where the cost of skilled labor is high. The principal object of the present invention is to provide a simple scale reading system for an optically read theodolite which has a minimum number of relatively simple optical parts. Another object of the invention is to provide a scale reading system for reading both the horizontal and vertical scales of a theodolite which is limited to one side of the instrument and which is almost entirely contained within one standard of the instrument. Another object of the invention is to provide a scale reading system for reading both the horizontal and vertical scales of a theodolite through a single eyepiece and which has only a single opening for illumination. Another object of the invention is to provide a scale reading system for an optically read theodolite which does not require the use of complicated prisms.

The above and other objects of the invention will be more fully understood by reference to the following description taken in connection with the drawing in which Fig. I is a view in elevation and partly in section of a theodolite showing the improved scale reading system.

Fig. II is a view showing the improved scale reading system as seen through the scale reading eyepiece.

Referring to Fig. I an alidade housing 2 is provided which is generally hollow in order that it can carry within itself the necessary optical and mechanical parts which go to make up the instrument. The instrument is thus fully enclosed so that the essential parts are protected from dust, dirt and the like. The alidade housing 2 is mounted on a tribrach or levelling head 4 (not completely shown) by means of which the instrument may be fastened to a tripod and levelled thereon. The alidade housing 2 is rotatable with respect to the tribrach or levelling head 4 about a vertical axis. The alidade housing 2 includes a base portion 6 and two upright standard portions 8 and 10. A telescope 12 is mounted on a horizontal axle 14 for rotation about a horizontal axis 16 between the upright standard portions 8 and 10.

A transparent horizontal protractor scale 18 is provided within the base portion 6 of the alidade housing 2. The transparent horizontal protractor scale 18 may be secured to the tribrach or levelling head 4 so that the alidade housing 2 and telescope 12 may be rotated with respect thereto. The position of the alidade housing 2 and the telescope 12 in azimuth with respect to the levelling head 4 is determined by means of the transparent horizontal protractor scale 18 and the scale reading system which is to be described.

A transparent vertical protractor scale 20 is mounted within the standard portion 8 of the alidade housing 2. The transparent vertical protractor scale is secured to the horizontal axle 14 for rotation with the telescope 12 about the horizontal axis 16 by means of the vertical protractor mount 22 and the screws 23. The transparent vertical protractor scale determines the position of the telescope 12 in elevation by means of the scale reading system about to be described.

A light transmitting opening 24 is provided in the outside wall of the standard portion 8 of the alidade housing 2 adjacent the lower part of the vertical protractor scale 20. The opening 24 is covered by means of a window 26 which may or may not also be a light condensing lens. The window 26 is preferably provided with a light diffusing surface, i. e. a ground or etched surface. A reflector 28 is mounted on the outside of standard portion 8 of the alidade housing 2 adjacent the light transmitting opening 24. The reflector 28 is adjustable about the pivot pin 30 and by rotation about the axis 32 so that it can be set to direct the maximum amount of light through the light transmitting opening 24 and through the transparent vertical protractor scale 20. A diaphragm 72 having an opening on the axis 32 is provided to cut out stray light coming through the light transmitting opening 24.

A reflector 34 is mounted on the opposite side of the vertical protractor scale 20 from the light transmitting opening 24. The reflector 34 may be cemented to the reflector mount 36 which is secured to the inside wall of the standard portion 8 of the alidade housing 2 by the screw 38. The reflector 34 is preferably a front surface reflector having its reflecting surface at substantially 45° to the optical axis 32 and in a plane perpendicular to the plane of the drawing to reflect the light passing through the transparent vertical protractor scale 20 downward. For night illumination an artificial light source may be placed over the opening 24.

A lens system made up of the doublet lenses 40 and 42 is provided in the path of the downwardly reflected light for imaging graduation lines 21 of the vertical protractor scale 20 into the same plane as the graduation lines 19 which lie below the reflector 34 on the horizontal protractor scale 18. A pair of achromatic doublet lenses such as 40 and 42 are preferred for this lens system because the required degree of optical correction consistent with the aperture required to give a bright image can be achieved in this system. If a greater or less degress of correction is desired, the lens system may be changed accordingly.

A tube 44 is cast integrally with the inner wall of the standard portion 8 of the alidade housing 2. The lenses 40 and 42 are mounted in short tubular mounts 46 and 48 by conventional methods. The mounts 46 and 48 are positioned in the tube 44 and held in position therein as by the screws 50 and 51. The screws 50 and 51 pass through slots in the tube 44 so that the lenses 40 and 42 may be adjusted to give the proper magnification to the lens system by loosening the screws 50 and 51 and sliding the mounts 46 and 48 in the tube 44. When the lenses 40 and 42 are properly adjusted they are locked in place by tightening the screws 50 and 51. The magnification of the lens system made up of the achromatic doublet lenses 40 and 42 when properly adjusted is preferably such so as to make the spaces between images of the vertical protractor graduation lines equal to the spaces between the horizontal protractor graduation lines. In other words the images of the vertical protractor graduation lines should radiate from the same center as the graduation lines on the horizontal protractor scale.

To accomplish this, the magnification of the lens system made up by lenses 40 and 42 should equal the ratio of the radius from the center of the horizontal protractor scale divisions to the position at 19 where the image of the vertical scale divisions is formed divided by the radius to the divisions on the vertical protractor scale 21 measured from the horizontal axis 16.

A second tube 52 is mounted within the standard portion 8 of the alidade housing 2. For example this tube may be joined to the first tube 44 as shown or it may be secured to the housing directly. A prism mount 54 is joined to the lower end of the tube 52 as by soldering. A prism 56 is held in prism mount 54 by the spring 58. The prism 56 changes the direction of the light passing downward through the protractor scale 18 and displaces the optical axis from the axis of the tube 44 to the axis of the tube 52. The optical axis passing through the tube 52 extends between the vertical protractor scale 20 and the outer wall of the standard portion 8 of the alidade housing 2.

A reflector 60 is mounted to reflect the light travelling upward through the tube 52 inward along the horizontal axis 16 about which the telescope 12 rotates. The reflector 60 is also preferably a front surface mirror and is cemented to the mount 62 which is secured to a cast projection within the housing by means of screw 64.

The index glass 66 is mounted so its axis lies on the horizontal axis 16 about which the telescope 12 rotates. The index glass 66 is held in the mount 68 by the threaded bushing 70. The mount 68 is secured to the diaphragm 72 which in turn is secured to the standard portion 8 of the alidade housing 2.

A second lens system made up of doublet lenses 74 and 76 is provided in the tube 52 in the path of the upwardly reflected light for imaging the graduation lines 19 of the horizontal protractor scale and the image of the graduation lines of the vertical protractor scale 21 into the same plane as a micrometer scale 67 provided on the index glass 66. A pair of achromatic doublet lenses are also preferred for this lens system because the required degree of optical correction consistent with the aperture required to give a bright image can be achieved in this manner. If a greater or less degree of correction is desired, the lens system may be changed accordingly.

The lenses 74 and 76 are mounted in short tubular mounts 78 and 80 which are positioned in the tube 52 and adjustably held in position therein by means of screws 82 and 84 in the same manner as doublet lenses 40 and 42. A diaphragm 86 is provided at the upper end of the mount 80 to cut out any stray light which may have passed this far through the optical system.

The appearance of the scales superimposed in the plane of the micrometer scale 67 as seen through the eyepiece 88 is shown in Fig. II. In the embodiment shown, the index glass 66 is provided with an opaque coating 89 forming the block openings 90 and 92. In the upper block opening 90 the letter H is provided on the index glass to indicate that the horizontal scale readings are made in this block opening. The letter V is provided on the index glass in the lower block opening 92, to indicate that the vertical scale readings are made in this block opening. A micrometer scale is provided on the index glass in each of the block openings 90 and 92 for reading the horizontal and vertical scales respectively. However, it will be understood that a single micrometer scale covering the images of both scales can be used for reading both horizontal and vertical angles.

The images of the horizontal and vertical scales projected into the plane of the micrometer scales 67 are also shown in block openings 90 and 92 of Fig. II. The images of the graduations of the horizontal and vertical scales extend beyond the micrometer scale graduations. The horizontal protractor scale graduations are numbered on both ends. One end is numbered for clockwise reading and the other for counterclockwise reading. The horizontal micrometer scale is also numbered on both ends of the line for clockwise and counterclockwise reading. In the embodiment shown, the vertical protractor scale and the vertical micrometer scale are numbered on one end of the lines for reading in one direction only. To illustrate the reading of the scales, the horizontal scale reading in one direction is 272° 06′ and in the other direction 86° 54′. The reading of the vertical scale is 302° 55′.

In the preferred embodiment, both the horizontal and vertical protractor scales are graduated in degrees. The spaces between the main divisions (numbered 0 and 60) of both the horizontal and vertical micrometer scales correspond to degrees (the spacing between graduations on the protractor scales). The spaces between the nearest subdivisions on the micrometer scales correspond to minutes. (For the sake of simplicity in the drawing, the micrometer scales are shown graduated only to ten minute intervals.) With the preferred graduation of scales it is possible to make estimated readings to one tenth of a minute of arc. It should of course be understood that other methods of graduation may also be used. For example the protractor scales could be graduated every 30 minutes or every 20 minutes in which case the space between main divisions of the micrometer scale would correspond to these angles. The European system of graduation in which the circle is divided into 400 parts or other systems of graduation may also be used.

The micrometer scale graduations should theoretically also be angular graduations and this type of graduation is preferred but in some cases sufficient accuracy will be obtained if linear graduations are used. The magnification of the second lens system made up of the lenses 74 and 76 (when properly adjusted) should be such as to make the space between graduation lines, in the images of the vertical and horizontal protractor scales projected into the plane of the micrometer scale 67, equal to the space between the main graduation lines of their respective micrometer scales on the index glass 66. If the micrometer scale is provided with an angular graduation, the graduation lines of the micrometer scales should radiate from the same center as the images of the graduation lines of the horizontal and vertical protractor scales projected into the same plane. This will be accomplished if the magnification of this second lens system equals the ratio of the radius of the horizontal micrometer scale divisions divided by the radius of the divisions on the horizontal protractor scale. This magnification should also equal the ratio of the radius of the vertical micrometer scale divisions divided by the radius of the image of the vertical protractor scale divisions projected into the plane of the horizontal protractor scale. The magnification of the combined lens system (made up of lenses 40, 42, 74 and 76) should equal the ratio of the radius of the vertical micrometer scale divisions divided by the radius of the divisions on the vertical protractor scale.

A reflector 94 (preferably a first surface reflector) is mounted inside the axle 14 for rotation therewith at an angle of 45° with the horizontal axis 16 to project the light passing through the index glass 66 in a direction parallel to the telescope line of sight. An auxiliary eyepiece tube 96 is mounted parallel to the telescope to receive the light reflected by the reflector 94. In the embodiment shown, the auxiliary eyepiece tube 96 is threaded into the axle 14 and secured by a set screw 98. An erecting lens 100 is mounted in the auxiliary eyepiece tube 96 to image the scales superimposed on the surface 67 of the index glass 66 to a plane 102. One achromatic doublet lens is suitable for the purpose. The lens 100 is secured in a tubular mount 104 which is adjustably secured inside the auxiliary eyepiece tube 96 by screw 106. Diaphragms 108 and 110 are provided in front of the erecting lens 100 and at the focal plane 102 for the purpose of reducing stray light.

An eyepiece 112 is mounted at the free end of the auxiliary eyepiece tube for viewing the focal plane 102. One achromatic doublet is also satisfactory for the eyepiece. The eyepiece 112 is mounted in a cell 114 and held therein by a washer 116 and bushing 118 threaded into the cell 114. The bushing 118 is threaded onto the free end of auxiliary eyepiece tube 96. The eyepiece 112 is focused by turning the bushing 118 on these threads.

A plano parallel tilting plate 120 is provided in the optical path between the vertical protractor scale 20 and the horizontal protractor scale 18 for setting the vertical index. The vertical scale is preferably numbered and mounted to read 0 when the telescope sights vertically upward and 90° when the telescope sights along a horizontal line. The vertical index is then set by levelling up the instrument and sighting at a horizontal collimator. The plano parallel tilting plate is then turned to displace the line of sight from the vertical protractor scale until the graduation line marked 90 lines up with the main graduation line marked 0 of the vertical micrometer scale. The plano parallel tilting plate is secured to mount 122 as by cement and pivotally mounted to the inside wall of standard portion 8 of the alidade housing 2 by screw 124.

A shield 126 may be provided to cover the numbers on either one end of the horizontal protractor scale lines or the other. The shield 126 is pivoted about the axis 128 and is manually operated by means of the lever arm 130. When taking clockwise readings the lever arm is turned to one direction and when taking counterclockwise readings the lever arm is turned to the opposite direction.

The scale reading system described is almost completely contained within one standard of the instrument. The optical parts required are all relatively simple and are few in number. These features will substantially decrease the cost of manufacturing.

Having thus described the invention what is claimed is:

1. A theodolite comprising an alidade housing having a base portion and two upright standard portions, a telescope mounted between said standard portions for rotation about a horizontal axis, a transparent horizontal protractor scale for indicating the position of said telescope in azimuth mounted within said base portion, a transparent vertical protractor scale for indicating the position of said telescope in elevation mounted within one of said standard portions, said housing having a light transmitting opening in said same standard portion adjacent the lower part of said vertical protractor scale, illuminating means for directing light through said opening and through said vertical protractor scale, a reflector on the opposite side of said vertical protractor scale from the opening for reflecting light from said vertical protractor scale downward, a first lens system in the path of the downwardly reflected light for imaging graduation lines of said vertical protractor scale into the same plane as graduation lines of said horizontal protractor scale below said reflector, reflecting means for changing the direction of the light passing downward through said horizontal protractor scale and displacing the optical axis to project the light upward within said same standard portion along an optical axis extending between said vertical protractor scale and the outer wall of said same standard portion of the housing, an index glass mounted along the optical path of the light which passes upward along said optical axis, said index glass being provided with at least one micrometer scale having a pair of main graduation lines and subdivision graduation lines, said main graduation lines defining a space corresponding to the space between graduation lines on at least one of said protractor scales, a second lens system in the path of the upwardly reflected light for imaging graduation lines of said horizontal protractor scale and the images of graduation lines of said vertical protractor scale into the same plane as said micrometer scale on said index glass so that images of graduation lines of said horizontal protractor scale are superimposed on a micrometer scale and images of graduation lines of said vertical protractor scale are superimposed on a micrometer scale, the magnification of said second lens system being such as to make the space between images of the graduation lines of said horizontal protractor scale equal to the space between a pair of main graduation lines in said micrometer scale on which said images of said horizontal protractor graduation lines are superimposed and the magnification of said combined first and second lens systems being such as to make the space between images of the graduation lines of said vertical protractor scale equal to the space between a pair of main graduation lines in said micrometer scale on which said images of said vertical protractor graduation lines are superimposed.

2. A theodolite comprising an alidade housing having a base portion and two upright standard portions, a telescope mounted for rotation about a horizontal axis between said standard portions, a transparent horizontal protractor scale for indicating the position of said telescope in azimuth mounted within said base portion, a transparent vertical protractor scale for indicating the position of said telescope in elevation within one of the standard portions, said housing having a light transmitting opening in said same standard portion adjacent the lower part of said vertical protractor scale, illuminating means for directing light through said opening and through said vertical protractor scale, a reflector on the opposite side of said vertical protractor scale from said opening for reflecting light from said vertical protractor scale downward, a lens system in the path of the downwardly reflected light for imaging graduation lines of said vertical protractor scale into the same plane as graduation lines of said horizontal protractor scale below said reflector, the magnification of said lens system being such as to make the space between graduation lines in the image of the vertical protractor scale equal to the space between graduation lines on the horizontal scale, reflecting means for changing the direction of the light passing downward through said horizontal protractor scale and displacing the optical axis to project the light upward within said same standard portion along an optical axis extending between said vertical protractor scale and the outer wall of said same standard portion of the housing, an index glass mounted along the optical path of the light which passes upward along said optical axis, said index glass being provided with a micrometer scale having a pair of main graduation lines and subdivision graduation lines, said main graduation lines defining a space corresponding to the space between graduation lines on the horizontal and vertical protractor scales, a second lens system in the path of the upwardly reflected light for imaging graduation lines of said horizontal protractor scale and the images of graduation lines of said vertical protractor scale into the same plane as graduation lines on said index glass so that said micrometer scale graduation lines appear to be superimposed on graduation lines of both said horizontal and vertical protractor scales, the magnification of said second lens system being such as to make the space between graduation lines in the images of the vertical and horizontal protractor scales equal to the space between the pair of main graduation lines on the index glass and means for viewing said images of the horizontal and vertical protractor graduation lines superimposed on said micrometer scale.

3. A theodolite comprising an alidade housing having a base portion and two upright standard portions, a telescope mounted between said standard portions for rotation about a horizontal axis, a transparent horizontal protractor scale for indicating the position of said telescope in azimuth mounted within said base portion, a transparent vertical protractor scale for indicating the position of said telescope in elevation mounted within one of said standard portions, said housing having a light transmitting opening in said same standard portion adjacent the lower part of said vertical protractor scale, illuminating means for directing light through said opening and through said vertical protractor scale, a reflector on the opposite side of said vertical protractor scale from the opening for reflecting light from said vertical protractor scale downward, a first lens system in the path of the downwardly reflected light for imaging graduation lines of said vertical protractor scale into the same plane as graduation lines of said horizontal protractor scale below said reflector, reflecting means for changing the direction of the light passing downward through said horizontal protractor scale and displacing the optical axis to project the light upward within said same standard portion along an optical axis extending between said vertical protractor scale and the outer wall of said same standard portion of the housing, a reflector mounted to reflect the upwardly travelling light inward along the horizontal axis about which the telescope rotates, an index glass mounted on the horizontal axis about which the telescope rotates, said index glass being provided with at least one micrometer scale having a pair of main graduation lines and subdivision graduation lines, said main graduation lines defining a space corresponding to a space between graduation lines on at least one of said protractor scales, a second lens system in the path of the upwardly reflected light for imaging graduation lines of said horizontal protractor scale and the images of graduation lines of said vertical protractor scale into the same plane as said micrometer scale on said index glass so that images of graduation lines of said horizontal protractor scale are superimposed on a micrometer scale and images of graduation lines of said vertical protractor scale are superimposed on a micrometer scale, the magnification of said second lens system being such as to make the space between images of the graduation lines of said horizontal protractor scale equal to the space between a pair of main graduation lines in said micrometer scale on which said images of said horizontal protractor graduation lines are superimposed and the magnification of said combined first and second lens systems being such as to make the space between images of the graduation lines of said vertical protractor scale equal to the space between a pair of main graduation lines in said micrometer scale on which said images of said vertical protractor graduation lines are superimposed, a reflector on the horizontal axis about which said telescope pivots mounted to reflect light passing through said index glass in a direction substantially parallel to the line of sight of the telescope, said last named reflector being mounted to rotate with said telescope about the horizontal axis so that the reflected light will at all times be substantially parallel to the optical axis of the telescope, an auxiliary eyepiece tube parallel to the telescope to receive the light reflected by said last named reflector, an erecting lens mounted in said auxiliary eyepiece tube near the horizontal axis to image said superimposed scales at a focal plane within said auxiliary eyepiece tube and an eyepiece at the free end of said auxiliary eyepiece tube for viewing said focal plane.

4. A theodolite comprising an alidade housing having a base portion and two upright standard portions, a telescope mounted between said standard portions for rotation about a horizontal axis, a transparent horizontal protractor scale for indicating the position of said telescope in azimuth mounted within said base portion, a transparent vertical protractor scale for indicating the position of said telescope in elevation mounted within one of said standard portions, said housing having a light transmitting opening in said same standard portion adjacent the lower part of said vertical protractor scale, illuminating means for directing light through said opening and through said vertical protractor scale, a reflector on the opposite side of said vertical protractor scale from the opening for reflecting light from said vertical protractor scale downward, a first lens system in the path of the downwardly reflected light for imaging graduation lines of said vertical protractor scale into the same plane as graduation lines of said horizontal protractor scale below said reflector, reflecting means for changing the direction of the light passing downward through said horizontal protractor scale and displacing the optical axis to project the light upward within said same standard portion along an optical axis extending between said vertical protractor scale and the outer wall of said same standard portion of the housing, an index glass mounted along the optical path of the light which passes upward along said optical axis, said index glass being provided with two micrometer scales both of which are provided with a pair of main graduation lines and subdivision graduation lines, said main graduation lines on one of said micrometer scales defining a space corresponding to a space between graduation lines on said horizontal protractor scale, said main graduation lines on the other of said micrometer scales defining a space corresponding to a space between graduation lines on said vertical protractor scale, a second lens system in the path of the upwardly reflected light for imaging graduation lines of said horizontal protractor scale and the images of graduation lines of said vertical protractor scale into the same plane as said micrometer scale on said index glass so that images of graduation lines of said horizontal protractor scale are superimposed on said first mentioned micrometer scale and images of said vertical protractor scale are superimposed on said second micrometer scale, the magnification of said second lens system being such as to make the space between images of the graduation lines of said horizontal protractor scale equal to the space between the pair of main graduation lines in said first mentioned micrometer scale on which said images of said horizontal protractor graduation lines are superimposed and the magnification of said combined first and second lens systems being such as to make the space between images of the graduation lines of said vertical protractor scale equal to the space between the pair of main graduation lines in said second mentioned micrometer scale on which said images of said vertical protractor graduation lines are superimposed.

5. A theodolite comprising an alidade housing having a base portion and two upright standard portions, a telescope mounted between said standard portions for rotation about a horizontal axis, a transparent horizontal protractor scale for indicating the position of said telescope in azimuth mounted within said base portion, a transparent vertical protractor scale for indicating the position of said telescope in elevation mounted within one of said standard portions, said housing having a light transmitting opening in said same standard portion adjacent the lower part of said vertical protractor scale, illuminating means for directing light through said opening and through said vertical protractor scale, a reflector on the opposite side of said vertical protractor scale from the opening for reflecting light from said vertical protractor scale downward, a first lens system in the path of the downwardly reflected light for imaging graduation lines of said vertical protractor scale into the same plane as graduation lines of said horizontal protractor scale below said reflector, reflecting means for changing the direction of the light passing downward through said horizontal protractor scale and displacing the optical axis to project the light upward within said same standard portion along an optical axis extending between said vertical protractor scale and the outer wall of said same standard portion of the housing, an index glass mounted along the optical path of the light which passes upward along said optical axis, said index glass being provided with at least one micrometer scale having a pair of main angular graduation lines, said main angular graduation lines defining an angle corresponding to the angle between graduation lines on at least one of said protractor scales, a second lens system in the path of the upwardly reflected light for imaging graduation lines of said horizontal protractor scale and the images of graduation lines of said vertical protractor scale into the same plane as said micrometer scale on said index glass so that images of graduation lines of said horizontal protractor scale are superimposed on a micrometer scale and images of graduation lines of said vertical protractor scale are superimposed on a micrometer scale, the magnification of said second lens system being equal to the ratio of the radius of the angular divisions in said micrometer scale on which images of graduation lines of said horizontal protractor scale are superimposed divided by the radius of the divisions in said horizontal protractor scale and the magnification of said combined first and second lens systems being equal to the ratio of the radius of the angular divisions in said micrometer scale on which images of graduation lines of said vertical protractor scale are superimposed divided by the radius of the divisions in said vertical protractor scale.

6. A theodolite comprising an alidade housing having a base portion and two upright standard portions, a telescope mounted between said standard portions for rotation about a horizontal axis, a transparent horizontal protractor scale for indicating the position of said telescope in azimuth mounted within said base portion, a transparent vertical protractor scale for indicating the position of said telescope in elevation mounted within one of said standard portions, said housing having a light transmitting opening in said same standard portion adjacent the lower part of said vertical protractor scale, illuminating means for directing light through said opening and through said vertical protractor scale, a reflector on the opposite side of said vertical protractor scale from the opening for reflecting light from said vertical protractor scale downward, a first lens system in the path of the downwardly reflected light for imaging graduation lines of said vertical protractor scale into the same plane as graduation lines of said horizontal protractor scale below said reflector, reflecting means for changing the direction of the light passing downward through said horizontal protractor scale and displacing the optical axis to project the light upward within said same standard portion along an optical axis extending between said vertical protractor scale and the outer wall of said same standard portion of the housing, an index glass mounted along the optical path of the light which passes upward along said optical axis, said index glass being provided with at least one micrometer scale having a pair of main graduation lines and subdivision graduation lines, said main graduation lines defining a space corresponding to the space between graduation lines on at least one of said protractor scales, a second lens system in the path of the upwardly reflected light for imaging graduation lines of said horizontal protractor scale and the images of graduation lines of said vertical protractor scale into the same plane as said micrometer scale on said index glass so that images of graduation lines of said horizontal protractor scale are superimposed on a micrometer scale and images of graduation lines of said vertical protractor scale are superimposed on a micrometer scale, the magnification of said second lens system being such as to make the space between images of the graduation lines of said horizontal protractor scale equal to the space between a pair of main graduation lines in said micrometer scale on which said images of horizontal protractor graduation lines are superimposed and the magnification of said combined first and second lens systems being such as to make the space between images of the graduation lines of said vertical protractor scale equal to the space between a pair of main graduation lines in said micrometer scale on which said images of said vertical protractor graduation lines are superimposed and a plano parallel tilting plate in the optical path of said first lens system for adjusting the vertical index.

7. A theodolite comprising an alidade housing having a base portion and two upright standard portions, a telescope mounted between said standard portions for rotation about a horizontal axis, a transparent horizontal protractor scale numbered clockwise and counterclockwise for indicating the position of said telescope in azimuth mounted within said base portion, a transparent vertical protractor scale for indicating the position of said telescope in elevation mounted within one of said standard portions, said housing having a light transmitting opening in said same standard portion adjacent the lower part of said vertical protractor scale, illuminating means for directing light through said opening and through said vertical protractor scale, a reflector on the opposite side of said vertical protractor scale from the opening for reflecting light from said vertical protractor scale downward, a first lens system in the path of the downwardly reflected light for imaging graduation lines of said vertical protractor scale into the same plane as graduation lines of said horizontal protractor scale below said reflector, reflecting means for changing the direction of the light passing downward through said horizontal protractor scale and displacing the optical axis to project the light upward within said same standard portion along an optical axis extending between said vertical protractor scale and the outer wall of said same standard portion of the housing, an index glass mounted along the optical path of the light which passes upward along said optical axis, said index glass being provided with two micrometer scales both of which are provided with a pair of main graduation lines and subdivision graduation lines, said main graduation lines on one of said micrometer scales defining a space corresponding to a space between graduation lines on said horizontal protractor scale said graduation lines of said same micrometer scale being numbered clockwise and counterclockwise, said main graduation lines on the other of said micrometer scales defining a space corresponding to a space between graduation lines on said vertical protractor scale, a second lens system in the path of the upwardly reflected light for imaging graduation lines of said horizontal protractor scale and the images of graduation lines of said vertical protractor scale into the same plane as said micrometer scale on said index glass so that images of graduation lines of said horizontal protractor scale are superimposed on said first mentioned micrometer scale and images of said vertical protractor scale are superimposed on said second micrometer scale, the magnification of said second lens system being such as to make the space between images of the graduation lines of said horizontal protractor scale equal to the space between the pair of main graduation lines in said first mentioned micrometer scale on which said images of said horizontal protractor graduation lines are superimposed and the magnification of said combined first and second lens systems being such as to make the space between images of the graduation lines of said vertical protractor scale equal to the space between the pair of main graduation lines in said second mentioned micrometer scale on which said images of said vertical protractor graduation lines are superimposed and a movable shield adjacent said index glass for hiding either the clockwise or counterclockwise numbering of the horizontal scale and the micrometer scale used therewith.

CONWAY D. HILLMAN.
ALLISTER L. BAKER.

No references cited.